(12) United States Patent
Moscetti (10) Patent No.: US 11,280,218 B2
(45) Date of Patent: Mar. 22, 2022

(54) BEARING HOUSING ASSEMBLY AND TURBOCHARGER INCLUDING THE SAME

(71) Applicant: BorgWarner Inc., Auburn Hills, MI (US)

(72) Inventor: Jason Paul Moscetti, Hendersonville, NC (US)

(73) Assignee: BorgWarner Inc., Auburn Hills, MI (US)

(*) Notice: Subject to any disclaimer, the term of this patent is extended or adjusted under 35 U.S.C. 154(b) by 57 days.

(21) Appl. No.: 16/828,339

(22) Filed: Mar. 24, 2020

(65) Prior Publication Data

US 2021/0301680 A1    Sep. 30, 2021

(51) Int. Cl.
| | |
|---|---|
| *F16C 17/02* | (2006.01) |
| *F16C 33/08* | (2006.01) |
| *F16C 35/02* | (2006.01) |
| *F01D 25/16* | (2006.01) |

(52) U.S. Cl.
CPC ............... *F01D 25/16* (2013.01); *F16C 17/02* (2013.01); *F16C 33/08* (2013.01); *F16C 35/02* (2013.01); *F05D 2220/40* (2013.01); *F05D 2240/50* (2013.01); *F05D 2240/60* (2013.01); *F16C 2226/70* (2013.01); *F16C 2226/76* (2013.01); *F16C 2360/24* (2013.01)

(58) Field of Classification Search
CPC .......... F16C 17/02; F16C 33/08; F16C 35/02; F16C 2360/24; F16C 2226/70; F16C 2226/76; F01D 25/162; F05D 2220/40; F05D 2240/50; F05D 2240/60

USPC .......... 384/287, 295–296, 603, 906; 417/407
See application file for complete search history.

(56) References Cited

U.S. PATENT DOCUMENTS

| | | | |
|---|---|---|---|
| 3,043,636 A * | 7/1962 | Macinnes ............... | F16C 27/02 384/287 |
| 4,704,075 A * | 11/1987 | Johnston ............... | F01D 25/125 417/407 |
| 4,721,441 A | 1/1988 | Miyashita et al. | |

(Continued)

FOREIGN PATENT DOCUMENTS

| | | | | |
|---|---|---|---|---|
| DE | 102012207010 A1 * | 10/2013 | ............... | F16C 17/18 |
| JP | 6540819 B2 * | 7/2019 | ......... | F04D 29/0413 |
| WO | WO-2020083434 A1 * | 4/2020 | ............... | F16C 43/02 |

*Primary Examiner* — Marcus Charles
(74) *Attorney, Agent, or Firm* — Howard & Howard Attorneys PLLC (57) ABSTRACT

A turbocharger includes a shaft extending between a first shaft end coupled to a turbine wheel, and a second shaft end coupled to a compressor wheel. The turbocharger also includes a bearing housing assembly including a bearing housing presenting an interior surface having a first diameter. The interior surface defines a bearing housing interior. A bushing is disposed in the bearing housing interior, extends between first and second bushing ends, is coupled to the shaft, and includes a first anti-rotation component. A retention shoulder extends away from the interior surface and radially inward proximate to one of the first and second bushing ends, and presents an inner surface having a second diameter less than the first diameter to limit axial movement of the bushing. The retention shoulder includes a second anti-rotation component engagable with the first anti-rotation component to limit rotational movement between the bushing and the bearing housing.

20 Claims, 10 Drawing Sheets

(56) References Cited

U.S. PATENT DOCUMENTS

| | | | |
|---|---|---|---|
| 5,207,566 A * | 5/1993 | Munkel | F16C 35/02 |
| | | | 417/407 |
| 7,670,056 B2 | 3/2010 | Petitjean et al. | |
| 7,766,550 B2 | 8/2010 | Larue | |
| 8,118,570 B2 | 2/2012 | Meacham et al. | |
| 8,226,296 B2 | 7/2012 | Larue | |
| 8,449,190 B2 | 5/2013 | Larue | |
| 8,734,130 B2 | 5/2014 | Meacham et al. | |
| 8,857,180 B2 * | 10/2014 | Begin | F16C 17/02 |
| | | | 60/605.3 |
| 9,068,473 B2 | 6/2015 | House et al. | |
| 9,140,185 B2 * | 9/2015 | Castan | F16C 35/02 |
| 9,382,812 B2 | 7/2016 | Meacham et al. | |
| 9,528,389 B2 * | 12/2016 | Koerner | F16C 33/08 |
| 9,581,044 B2 | 2/2017 | House et al. | |
| 9,745,992 B2 | 8/2017 | Barber et al. | |
| 9,790,812 B2 | 10/2017 | Ryu | |
| 9,810,231 B2 * | 11/2017 | Daguin | F01D 25/162 |
| 9,850,911 B2 | 12/2017 | Dayalan et al. | |
| 9,897,097 B2 | 2/2018 | Begin et al. | |
| 9,903,226 B2 * | 2/2018 | Uneura | F01D 25/186 |
| 9,963,998 B2 | 5/2018 | Marsal et al. | |
| 10,024,361 B2 | 7/2018 | Uneura et al. | |
| 10,316,742 B2 | 6/2019 | Hettinger et al. | |
| 10,895,166 B2 * | 1/2021 | Shioya | F01D 25/145 |
| 2007/0110351 A1 | 5/2007 | Larue | |
| 2014/0369820 A1 * | 12/2014 | Koch | F02C 6/12 |
| | | | 415/170.1 |
| 2015/0240871 A1 * | 8/2015 | Oki | F16C 17/02 |
| | | | 384/397 |
| 2015/0292562 A1 | 10/2015 | Maeda | |
| 2017/0175808 A1 | 6/2017 | Pruitt et al. | |
| 2018/0238227 A1 | 8/2018 | Wood et al. | |

* cited by examiner

BEARING HOUSING ASSEMBLY AND TURBOCHARGER INCLUDING THE SAME

BACKGROUND OF THE INVENTION

1. Field of the Invention

The present invention generally relates to a bearing housing assembly, and to a turbocharger including the bearing housing assembly.

2. Description of the Related Art

Turbochargers receive exhaust gas from an internal combustion engine of a vehicle and deliver compressed air to the internal combustion engine. Turbochargers are used to increase power output of the internal combustion engine, decrease fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in the vehicle reduces the mass and aerodynamic frontal area of the vehicle, which helps reduce fuel consumption of the internal combustion engine and improve fuel economy of the vehicle.

Typical turbochargers include a shaft extending along an axis between a first shaft end and a second shaft end. Turbochargers further include a turbine wheel coupled to the first shaft end of the shaft, and a compressor wheel coupled to the second shaft end of the shaft. The turbine wheel and the compressor wheel are rotatable with the shaft. Specifically, the exhaust gas from the internal combustion engine, which would normally contain wasted energy, is used to drive the turbine wheel, which is used to drive the shaft and, in turn, the compressor wheel to deliver compressed air to the internal combustion engine.

Turbochargers also include a bearing housing assembly including a bearing housing disposed about the shaft and presenting an interior surface defining a bearing housing interior. Typically, a bushing is disposed in the bearing housing interior. The bushing is coupled to the shaft for supporting rotation of the shaft. In some turbochargers, the bushing is prevented from rotating relative to the bearing housing by an anti-rotation component. However, anti-rotation components known in the art suffer from deficiencies including, but not limited to, increasing axial packaging space thus increasing the size of the turbocharger, increasing the complexity of componentry thus increasing cost of the turbocharger, and increasing the difficulty of assembly thus increasing manufacturing times of the turbocharger.

As such, there remains a need to provide for an improved bearing housing assembly for a turbocharger that limits rotational movement between the bushing and the bearing housing.

SUMMARY OF THE INVENTION AND ADVANTAGES

A turbocharger delivers compressed air to an internal combustion engine. The turbocharger includes a shaft extending along an axis between a first shaft end and a second shaft end. A turbine wheel is coupled to the first shaft end of the shaft, and a compressor wheel is coupled to the second shaft end of the shaft.

The turbocharger also includes a bearing housing assembly. The bearing housing assembly includes a bearing housing disposed about the shaft and presenting an interior surface having a first diameter. The interior surface of the bearing housing defines a bearing housing interior. A bushing is disposed in the bearing housing interior. The bushing extends between a first bushing end and a second bushing end, and the bushing is coupled to the shaft for supporting rotation of the shaft. The bushing includes a first anti-rotation component.

The bearing housing assembly also includes a retention shoulder extending away from the interior surface of the bearing housing and radially inward toward the axis proximate to one of the first and second bushing ends. The retention shoulder presents an inner surface having a second diameter less than the first diameter of the interior surface of the bearing housing. The retention shoulder limits axial movement of the bushing within the bearing housing interior. The retention shoulder includes a second anti-rotation component engagable with the first anti-rotation component to limit rotational movement between the bushing and the bearing housing.

The retention shoulder limits both axial movement and rotational movement of the bushing within the bearing housing interior. As such, the retention shoulder decreases the axial packaging space required to limit axial movement and rotational movement of the bushing within the bearing housing interior. The retention shoulder thus also decreases the size of the turbocharger. Moreover, because the retention shoulder accomplishes limitation of both axial movement and rotational movement of the bushing within the bearing housing interior, the complexity of componentry is decreased (i.e., fewer components are needed to limit both axial movement and rotational movement of the bushing within the bearing housing interior), the cost of the turbocharger is decreased, the difficulty of assembling the turbocharger is decreased, and the manufacturing time of the turbocharger is decreased.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
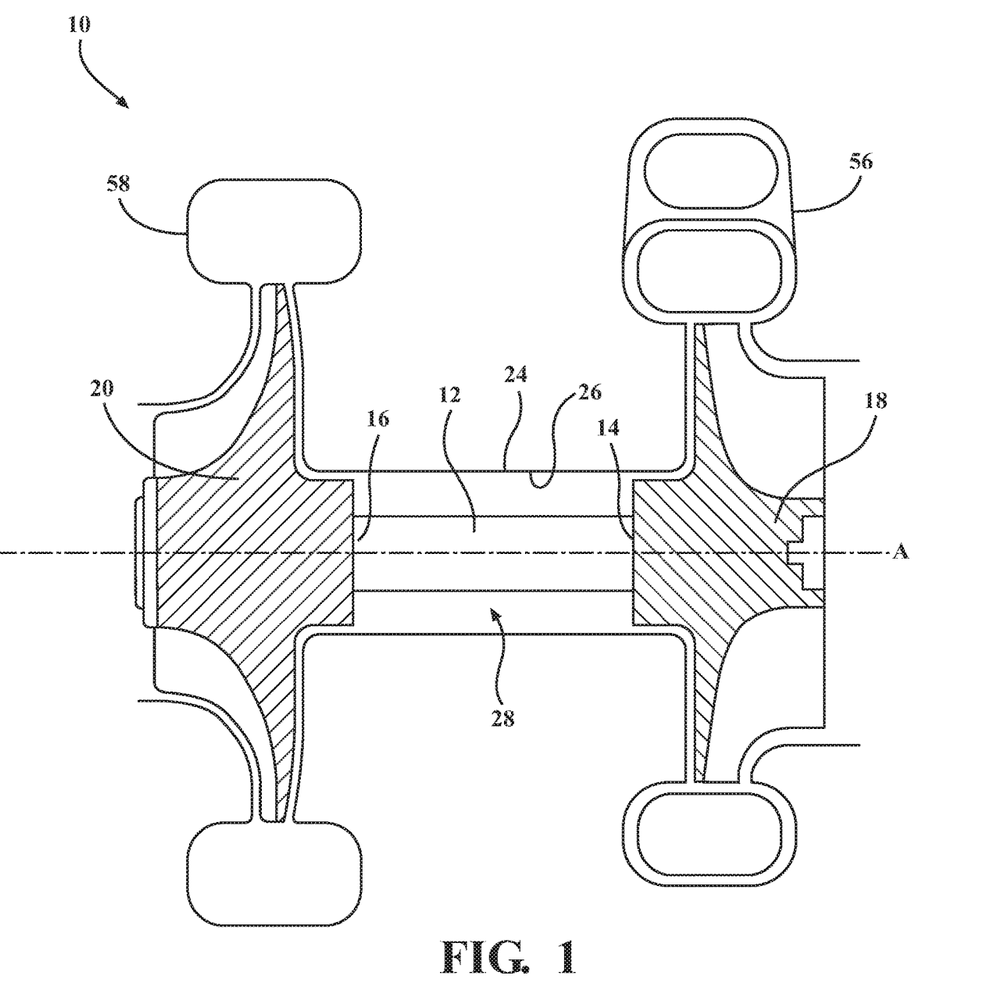
FIG. 1 is a schematic illustration of a turbocharger having a bearing housing presenting an inner surface defining a bearing housing interior, a shaft disposed in the bearing housing interior and extending along an axis A between a first shaft end coupled to a turbine wheel and a second shaft end coupled to a compressor wheel.

With reference to the Figures, wherein like numerals indicate like parts throughout the several views, a turbocharger 10 is shown schematically in FIG. 1. The turbocharger 10 delivers compressed air to an internal combustion engine. The turbocharger 10 includes a shaft 12 extending along an axis A between a first shaft end 14 and a second shaft end 16. It is to be appreciated that the first and second shaft ends 14, 16 of the shaft 12 need not be the exact terminus of the shaft 12. A turbine wheel 18 is coupled to the first shaft end 14 of the shaft 12, and a compressor wheel 20 is coupled to the second shaft end 16 of the shaft 12. The turbine wheel 18 and the compressor wheel 20 are rotatable with the shaft 12. Specifically, the exhaust gas from the internal combustion engine, which would normally contain wasted energy, is used to drive the turbine wheel 18, which is used to drive the shaft 12 and, in turn, the compressor wheel 20 to deliver compressed air to the internal combustion engine.

The turbocharger 10 also includes a bearing housing assembly 22. As shown in FIGS. 2A-2D, the bearing housing assembly 22 includes a bearing housing 24 disposed about the shaft 12. The bearing housing 24 presents an interior surface 26 having a first diameter D1. The interior surface 26 of the bearing housing 24 defines a bearing housing interior 28. A bushing 30 is disposed in the bearing housing interior 28. The bushing 30 extends between a first bushing end 32 and a second bushing end 34, and the bushing 30 is coupled to the shaft 12 for supporting rotation of the shaft 12. The bushing 30 includes a first anti-rotation component 36, as shown in FIGS. 3A-4C.

As shown in FIGS. 2A-2D, the bearing housing assembly 22 also includes a retention shoulder 38 extending away from the interior surface 26 of the bearing housing 24 and radially inward toward the axis A proximate to one of the first and second bushing ends 32, 34. As shown in FIGS. 3A-4C, the retention shoulder 38 presents an inner surface 40 having a second diameter D2 less than the first diameter D1 to limit axial movement of the bushing 30 with the bearing housing interior 28. The retention shoulder 38 includes a second anti-rotation component 42 engageable with the first anti-rotation component 36 to limit rotational movement between the bushing 30 and the bearing housing 24.

Therefore, the retention shoulder 38 limits both axial movement and rotational movement of the bushing 30 within the bearing housing interior 28. Furthermore, the retention shoulder 38 decreases the axial packaging space required to limit axial movement and rotational movement of the bushing 30 within the bearing housing interior 28 because the retention shoulder 38 requires fewer components to limit both axial movement and rotational movement of the bushing 30 within the bearing housing interior 28. The retention shoulder 38 thus also decreases the size of the turbocharger 10. Moreover, because the retention shoulder 38 accomplishes limitation of both axial movement and rotational movement of the bushing 30 within the bearing housing interior 28, the complexity of componentry is decreased (i.e., fewer components are needed to limit both axial movement and rotational movement of the bushing 30 within the bearing housing interior 28), the cost of the turbocharger 10 is decreased, the difficulty of assembling the turbocharger 10 is decreased, and the manufacturing time of the turbocharger 10 is decreased.

As shown in FIGS. 2A-2D, the retention shoulder 38 is disposed proximate to one of the first and second bushing ends 32, 34. It is to be appreciated that the retention shoulder 38 need not be at one of the first and second bushing ends 32, 34 to be disposed proximate to one of the first and second bushing ends 32, 34. Instead, the retention shoulder 38 may be spaced between the first and second bushing ends 32, 34 while still being disposed proximate to one of the first and second bushing ends 32, 34. Although not required, the bushing 30 may have a first bushing portion 44 at the first bushing end 32, with the first bushing portion 44 having approximately, but less than, the first diameter D1. The bushing 30 may also have a second bushing portion 46 at the second bushing end 34, with the second bushing portion 46 having approximately, but less than, the first diameter D1. The bushing 30 may further have a third bushing portion 48 disposed between the first and second bushing portions 44, 46, with the third bushing portion 48 having a diameter less than the first diameter D1. Although not limiting, the retention shoulder 38 may be disposed at the first bushing portion 44 or at the second bushing portion 46 while still being disposed proximate to one of the first and second bushing ends 32, 34.

In some embodiments, the retention shoulder 38 is spaced from the first and second bushing ends 32, 34 along the axis A such that one of the first and second bushing ends 32, 34 is disposed between the retention shoulder 38 and the other of the first and second bushing ends 32, 34. In these embodiments, the retention shoulder 38 may be at one of the first and second bushing ends 32, 34 such that the retention shoulder 38 is flush with one of the first and second bushing ends 32, 34. Additionally, in these embodiments, the retention shoulder 38 may be spaced from the first and second bushing ends 32, 34 along the axis A such that a bushing end gap is defined between one of the first and second bushing ends 32, 34 and the retention shoulder 38.

Although not required, one of the first and second bushing ends 32, 34 of the bushing 30 may have a first retaining surface 50 extending radially away from the axis A and facing away from the other of the first and second bushing ends 32, 34, and the retention shoulder 38 may have a second retaining surface 52 facing the first retaining surface 50 to limit axial movement of the bushing 30 within the bearing housing interior 28.

The bushing 30 has an outer surface 54 facing the interior surface 26 of the bearing housing 24. The outer surface 54 of the bushing 30 axially adjacent to the retention shoulder 38 may have a third diameter D3 between the first and second diameters D1, D2 to limit axial movement of the bushing 30 within the bearing housing interior 28.

The outer surface 54 of the bushing 30 axially adjacent to the retention shoulder 38 may have a generally circular cross-section. It is to be appreciated, however, that the outer surface 54 of the bushing 30 axially adjacent to the retention shoulder 38 may have a cross-section having a variety of shapes including, but not limited to, oval, oblique, octogonal, or any other polygonal shape.

The retention shoulder 38 may have a generally circular cross-section. It is to be appreciated that the shape of the cross-section of the retention shoulder 38 may be complementary to the shape of the outer surface 54 of the bushing 30 axially adjacent to the retention shoulder 38. It is also to be appreciated that the cross-section of the retention shoulder 38 may deviate from this shape, at the location of the second anti-rotation component 42. For example, the cross-section of the retention shoulder 38 may deviate from being generally circular at the location of the second anti-rotation component 42.

In some embodiments, the bushing 30 is integral between the first and second bushing ends 32, 34. In the embodiments where the bushing 30 is integral between the first and second bushing ends 32, 34, the bushing 30 is a one-piece construction. In the embodiments where the bushing 30 is integral between the first and second bushing ends 32, 34, the bushing 30 requires only one anti-rotation constraint, namely, the first anti-rotation component 36, to limit rotation of the bushing 30 and the bearing housing 24.

Alternatively, in other embodiments, the bushing 30 is a two-piece construction, with two bushings 30 spaced apart from one another along the axis A. In the embodiment where the bushing 30 is a two-piece construction, both of the bushings 30 may require the first anti-rotation components 36 to limit rotation of each bushing 30 relative to the bearing housing 24. In yet another embodiment, the bushing 30 is a three-piece construction, with two bushings 30 spaced apart from one another along the axis A, and with a spacer disposed between the two bushings 30. In the embodiment where the bushing 30 is a three-piece construction, both of the bushings 30 may require the first anti-rotation components 36 to limit rotation of each bushing 30 relative to the bearing housing 24, and the spacer may be allowed to freely rotate about the axis A.

Figure 3A:
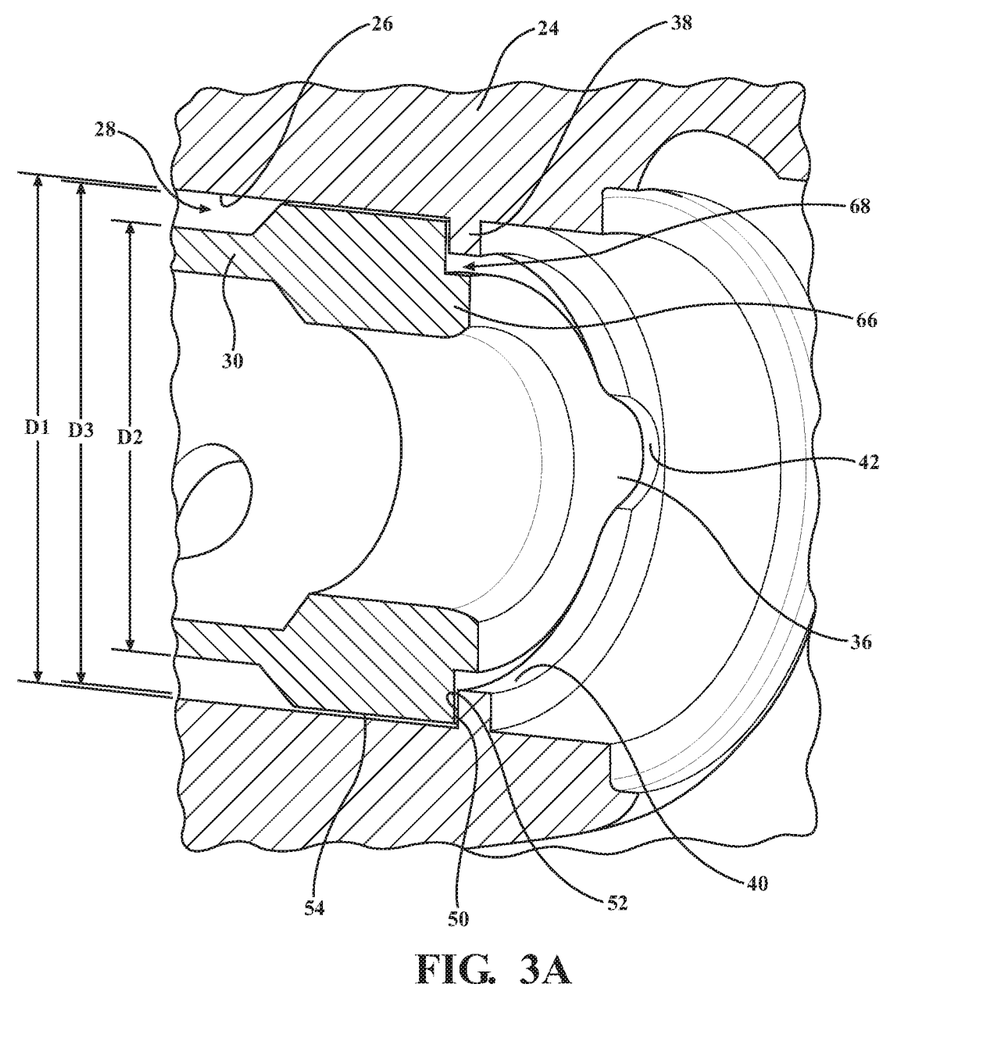
FIG. 3A is a perspective view, partially in cross-section, of the turbocharger, with the bushing including a first anti-rotation component and the retention shoulder including a second anti-rotation component engagable with the first anti-rotation component to limit rotational movement between the bushing and the bearing housing, and with the first anti-rotation component being male and the second anti-rotation component being female.
Figure 4A:
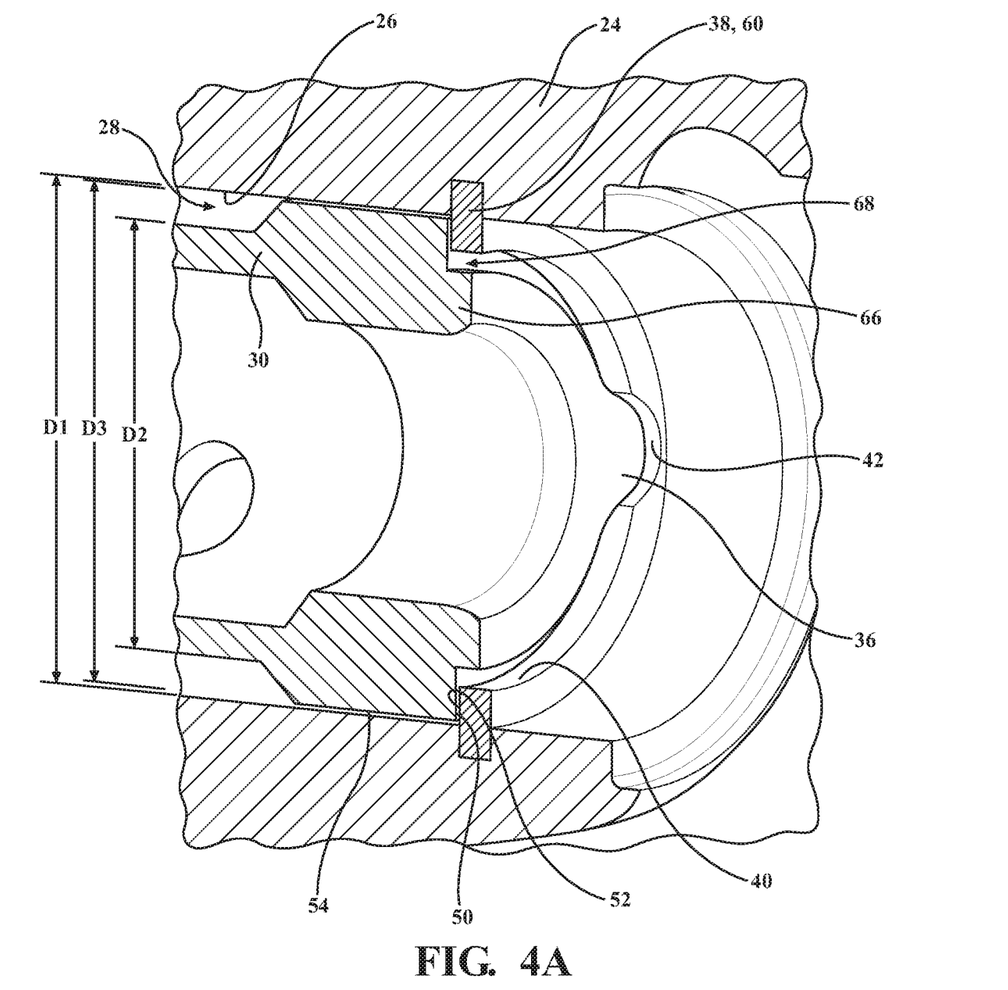
FIG. 4A is a perspective view, partially in cross-section, of the turbocharger, with the retention shoulder further defined as the retaining ring separate from the bearing housing, and with the first anti-rotation component being male and the second anti-rotation component being female.
Figure 4B:
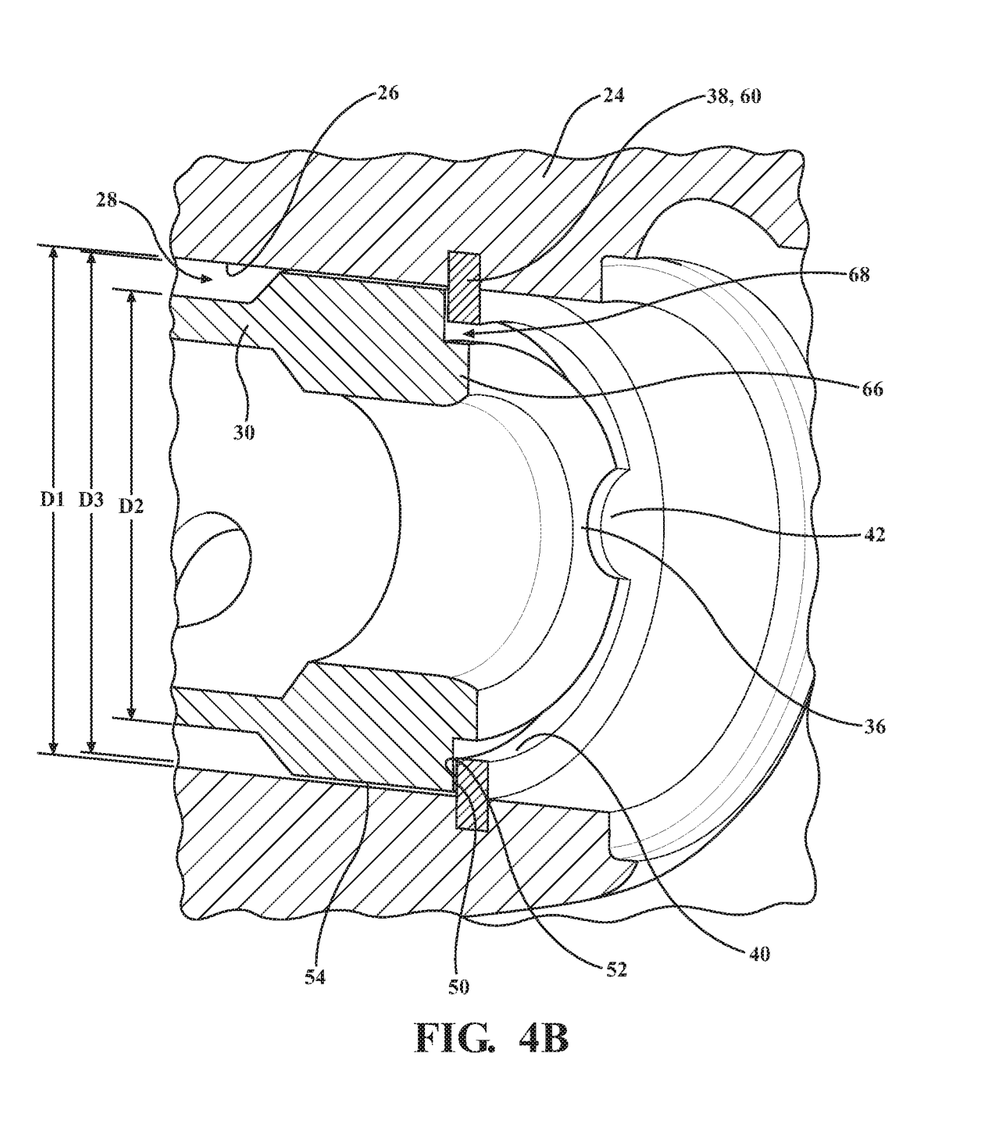
FIG. 4B is a perspective view, partially in cross-section, of the turbocharger, with the retention shoulder further defined as the retaining ring separate from the bearing housing, and with the first anti-rotation component being female and the second anti-rotation component being male.
Figure 4C:
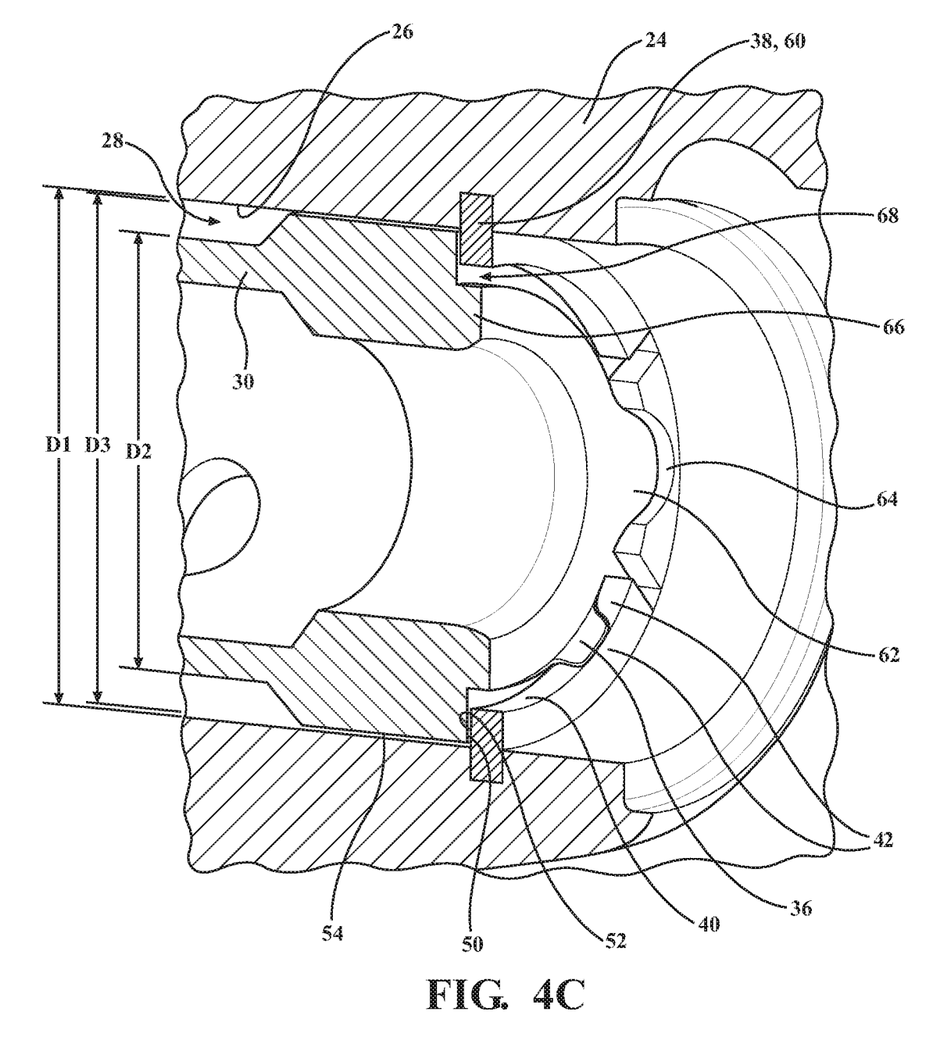
FIG. 4C is a perspective view, partially in cross-section, of the turbocharger, with the bushing including a third anti-rotation component and the bearing housing including a fourth anti-rotation component engageable with the third anti-rotation component to limit rotational movement between the bushing and the bearing housing.

In one embodiment, as shown in FIGS. 3A, 4A, and 4C, the first anti-rotation component 36 extends radially away from the bushing 30 and the second anti-rotation component 42 of the retention shoulder 38 is defined recessed into the retention shoulder 38. In other words, in the embodiments as shown in FIGS. 3A, 4A, AND 4C, the first anti-rotation component 36 is male, and the second anti-rotation component 42 is female. In the embodiment where the first anti-rotation component 36 is male, the first anti-rotation component 36 may be a variety of shapes including, but not limited to, semi-circular, oval, triangular, rectangular, or any other polygonal shape as long as the first anti-rotation component 36 extends radially away from the bushing 30. Said differently, in the embodiments where the first anti-rotation component 36 is male, the first anti-rotation component 36 protrudes away from the bushing 30. Similarly, the second anti-rotation component 42 may be defined recessed into the retention shoulder 38 to have a complementary shape to the shape of the first anti-rotation component 36 to be engagable with the first anti-rotation component 36.

Figure 3B:
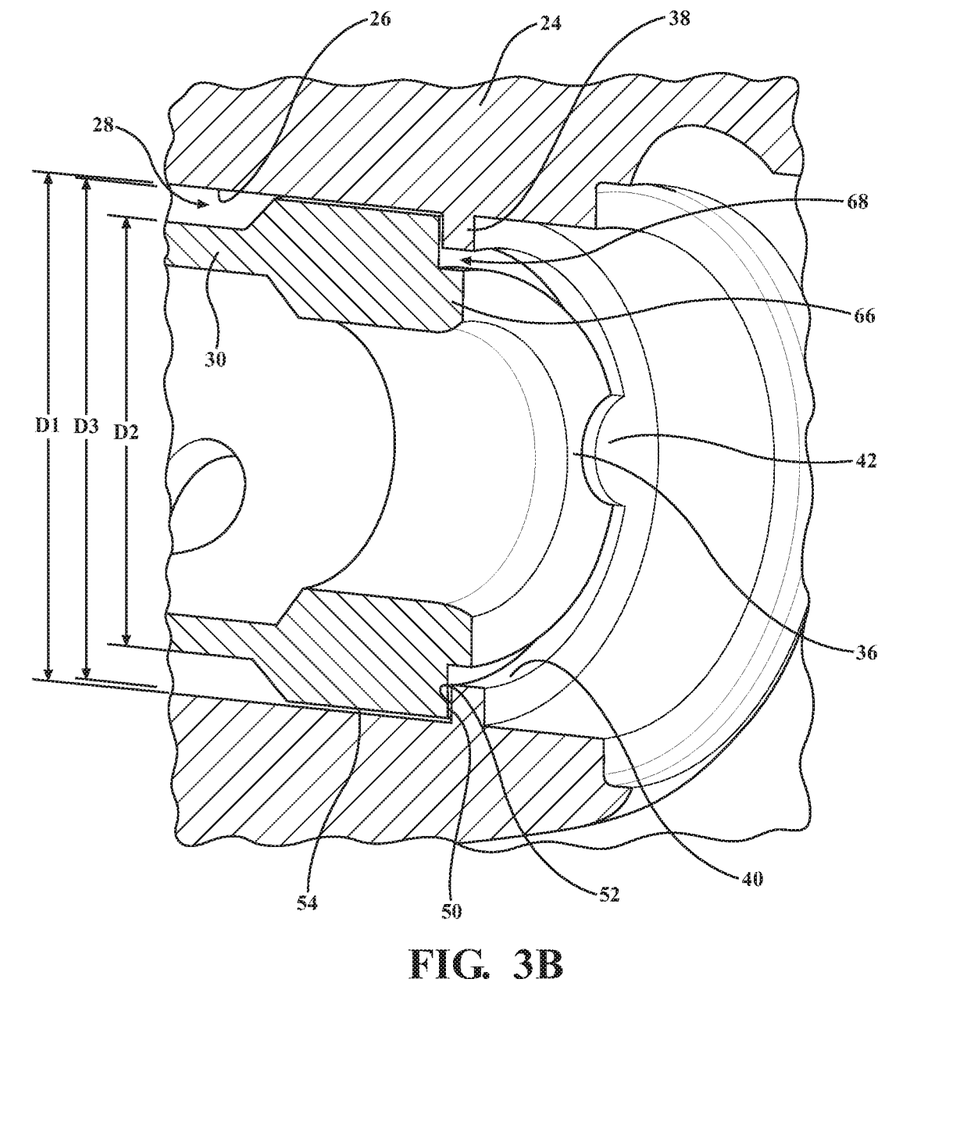
FIG. 3B is a perspective view, partially in cross-section, of the turbocharger, with the bushing including the first anti-rotation component and the retention shoulder including the second anti-rotation component engagable with the first anti-rotation component, and with the first anti-rotation component being female and the second anti-rotation component being male.

Alternatively, in another embodiment, as shown in FIGS. 3B and 4B, the first anti-rotation component 36 of the bushing 30 is defined recessed into the bushing 30 and the second anti-rotation component 42 of the retention shoulder 38 extends radially inward toward the axis A from the retention shoulder 38. In other words, in the embodiments as shown in FIGS. 3B and 4B, the first anti-rotation component 36 is female, and the second anti-rotation component 42 is male. When the second anti-rotation component 42 is male, the second anti-rotation component 42 may be a variety of shapes including, but not limited to, semi-circular, oval, triangular, rectangular, or any other polygonal shape as long as the second anti-rotation component 42 extends radially inward toward the axis A from the retention shoulder 38. Said differently, in the embodiments where the second anti-rotation component 42 extends radially inward toward the axis A from the retention shoulder 38, the second anti-rotation component 42 protrudes away from the retention shoulder 38. Similarly, the first anti-rotation component 36 may be defined recessed into the bushing 30 to have a complementary shape as to the shape of the second anti-rotation component 42 to be engagable with the second anti-rotation component 42.

Said differently, the first anti-rotation component 36 of the bushing 30 and the second anti-rotation component 42 of the retention shoulder 38 may have a male/female relationship with the first anti-rotation component 36 being male and the second anti-rotation component 42 being female, or may have a male/female relationship with the first anti-rotation component 36 being female and the second anti-rotation component 42 being male. It is to be appreciated that, in the embodiment where the second anti-rotation component 42 of the retention shoulder 38 extends radially inward toward the axis A from the retention shoulder 38, the second anti-rotation component 42 may also limit axial movement of the bushing 30 within the bearing housing interior 28.

Figure 2A:
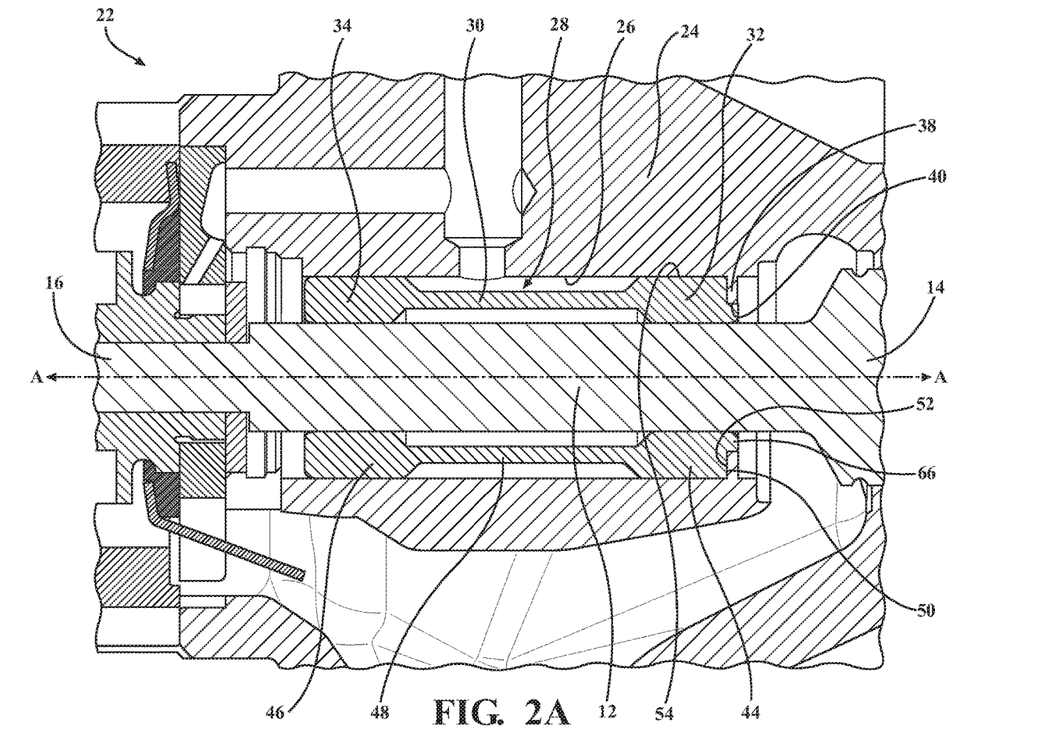
FIG. 2A is a cross-sectional view of the turbocharger along the axis A, with the turbocharger including a bushing extending between first and second bushing ends, and a retention shoulder extending away from an interior surface of the bearing housing and radially inward toward the axis A proximate to the first bushing end, with the retention shoulder integral with the bearing housing.
Figure 2B:
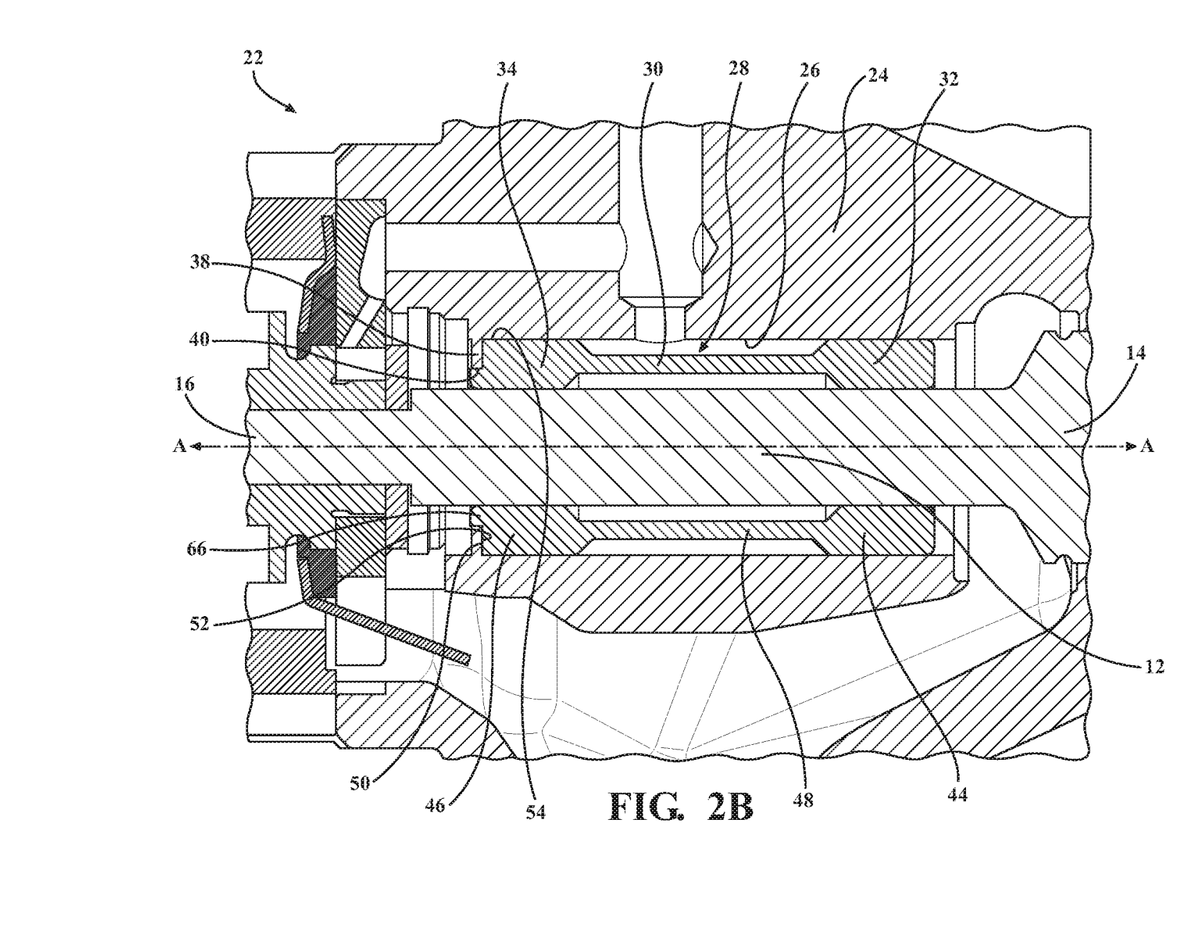
FIG. 2B is a cross-sectional view of the turbocharger along the axis A, with the retention shoulder extending away from the interior surface of the bearing housing and radially inward toward the axis A proximate to the second bushing end, with the retention shoulder integral with the bearing housing.
Figure 2C:
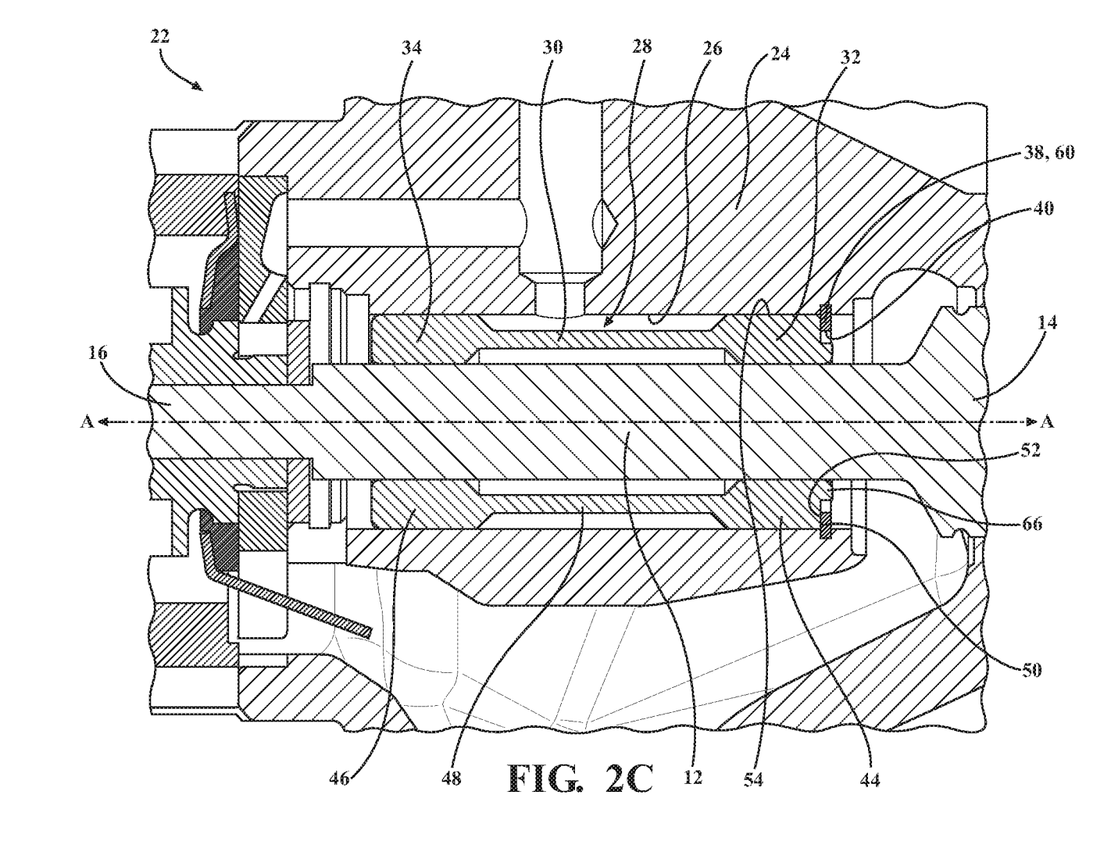
FIG. 2C is a cross-sectional view of the turbocharger along the axis A, with the retention shoulder extending away from the interior surface of the bearing housing and radially inward toward the axis A proximate to the first bushing end, with the retention shoulder further defined as the retaining ring separate from the bearing housing.

In one embodiment, as shown in FIGS. 2A and 2C, the first bushing end 32 is proximate to the first shaft end 14, and the retention shoulder 38 extends away from the interior surface 26 of the bearing housing 24 and radially inward toward the axis A proximate to the first bushing end 32. In other words, in the embodiments as shown in FIGS. 2A and 2C, the retention shoulder 38 extends away from the interior surface 26 of the bearing housing 24 and radially inward toward the axis A proximate to the first shaft end 14, and thus proximate to the turbine wheel 18. In this embodiment, the bushing 30 may be installed in the bearing housing assembly 22 by inserting the bushing 30 into the bearing housing interior 28 along the axis A from a compressor side of the turbocharger 10 where the compressor wheel 20 is coupled to the shaft 12. Also, in this embodiment, a rotating washer may be disposed about the shaft 12 proximate to the compressor wheel 20 to further limit axial movement of the bushing 30 within the bearing housing interior 28.

Figure 2D:
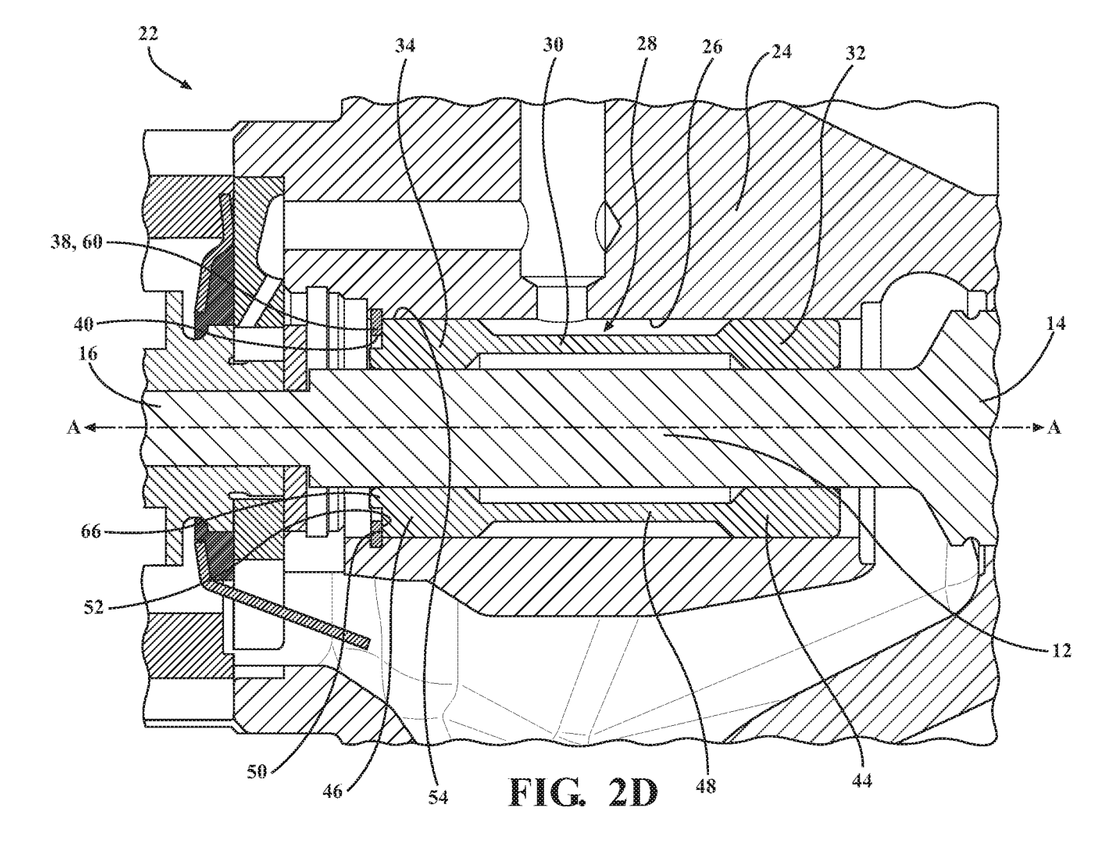
FIG. 2D is a cross-sectional view of the turbocharger along the axis A, with the retention shoulder extending away from the interior surface of the bearing housing and radially inward toward the axis A proximate to the second bushing end, with the retention shoulder further defined as the retaining ring separate from the bearing housing.

Alternatively, in another embodiment, as shown in FIGS. 2B and 2D, the second bushing end 34 is proximate to the second shaft end 16, and the retention shoulder 38 extends away from the interior surface 26 of the bearing housing 24 and radially inward toward the axis A proximate to the second bushing end 34. In other words, in the embodiments as shown in FIGS. 2B and 2D, the retention shoulder 38 extends away from the interior surface 26 of the bearing housing 24 and radially inward toward the axis A proximate to the second shaft end 16, and thus proximate to the compressor wheel 20. In this embodiment, the bushing 30 may be installed in the bearing housing assembly 22 by inserting the bushing 30 into the bearing housing interior 28 along the axis A from a turbine side of the turbocharger 10 where the turbine wheel 18 is coupled to the shaft 12. Also, in this embodiment, the rotating washer, or a snap ring, may be disposed about the shaft 12 proximate to the turbine wheel 18 to further limit axial movement of the bushing 30 within the bearing housing interior 28.

Once the bushing 30 is installed in the bearing housing assembly 22, the shaft 12 may be installed in the bearing housing assembly 22 by inserting the shaft 12 into the bearing housing interior 28 along the axis A from either the turbine side of the turbocharger 10 or from the compressor side of the turbocharger 10. The turbine wheel 18 may then be coupled to the first shaft end 14 of the shaft 12, for example, by friction welding or spin welding. The compressor wheel 20 may also be coupled to the second shaft end 16 of the shaft 12, for example, by a compressor nut. The compressor wheel 20 may be coupled to the second shaft end 16 of the shaft 12 either before, after, or at the same time as the turbine wheel 18 being coupled to the first shaft end 14 of the shaft 12.

The turbocharger 10 may further include a turbine housing 56 coupled to the bearing housing 24 and disposed about the turbine wheel 18, and may further include a compressor housing 58 coupled to the bearing housing 24 and disposed about the compressor wheel 20, as shown in FIG. 1. The turbine housing 56 and the compressor housing 58 may be coupled to the bearing housing 24 after the turbine wheel 18 is coupled to the first shaft end 14 of the shaft 12 and after the compressor wheel 20 is coupled the second shaft end 16 of the shaft 12.

The retention shoulder 38 may be integral with the bearing housing 24, as shown in FIGS. 2A, 2B, 3A, and 3B. In other words, the retention shoulder 38 and the bearing housing 24 may be one-piece. The retention shoulder 38 may be formed integrally with the bearing housing 24, for example, by casting, or may be formed separately and later joined, for example, by welding. It is to be appreciated that the retention shoulder 38 may be formed integrally with the bearing housing 24 by casting and subsequent machining.

In another embodiment, the retention shoulder 38 is further defined as a retaining ring 60 separate from the bearing housing 24, as shown in FIGS. 2C, 2D, and 4A-4C. In this embodiment, the retaining ring 60 and the bearing housing 24 are a two-piece construction. The retaining ring 60 may have a first retaining ring end and a second retaining ring end spaced circumferentially about the axis A from the first retaining ring end, with the first and second retaining ring ends defining a retaining ring gap therebetween. Alternatively, the retaining ring 60 may be of a spiral configuration.

Once the retention shoulder 38 is provided, the bushing 30 and shaft 12 may both be installed by insertion into the bearing housing interior 28 along the axis A. It is to be appreciated that, in the embodiments where the retention shoulder 38 is the retaining ring 60, the retaining ring 60 may also be installed by insertion into the bearing housing interior 28 along the axis A. As such, access to the bearing housing interior 28 through, for example, lubricant passages is not necessary to install the bushing 30, shaft 12, or retaining ring 60 and to manufacture the turbocharger 10.

Although not required, in the embodiments where the retention shoulder 38 is further defined as the retaining ring 60 separate from the bearing housing 24, the bushing 30 may include a third anti-rotation component 62 and the bearing housing 24 may include a fourth anti-rotation component 64 engageable with the third anti-rotation component 62 to limit rotational movement between the bushing 30 and the bearing housing 24. In this embodiment, as shown in FIG. 4C, the bushing 30 is directly limited from rotating relative to both the retaining ring 60 and the bearing housing 24. In other words, there exists two complementary sets of anti-rotation components to ensure limitation of rotational movement between the bushing 30 and the bearing housing 24 in the event of failure of one of the complementary sets of anti-rotation components (i.e., either the first and second anti-rotation components, or the third and second anti-rotation components). In turn, the complementary sets of anti-rotation components increase the reliability and life of the turbocharger 10.

The third anti-rotation component 62 may extend radially away from the bushing 30 and the fourth anti-rotation component 64 may be defined recessed into the bearing housing 24. In other words, the third anti-rotation component 62 may be male, and the fourth anti-rotation component 64 may be female. In the embodiment where the third anti-rotation component 62 is male, the third anti-rotation component 62 may be a variety of shapes including, but not limited to, semi-circular, oval, triangular, rectangular, or any other polygonal shape as long as the third anti-rotation component 62 extends radially away from the bushing 30. Said differently, in the embodiments where the third anti-rotation component 62 is male, the third anti-rotation component 62 protrudes away from the bushing 30. Similarly, the fourth anti-rotation component 64 may be defined recessed into the bearing housing 24 to have a complementary shape as to the shape of the third anti-rotation component 62 to be engagable with the third anti-rotation component 62.

Alternatively, in another embodiment, the third anti-rotation component 62 of the bushing 30 is defined recessed into the bushing 30 and the fourth anti-rotation component 64 of the retention shoulder 38 extends radially inward toward the axis A from the bearing housing 24. In other words, the third anti-rotation component 62 may be female, and the fourth anti-rotation component 64 may be male. When the fourth anti-rotation component 64 is male, the fourth anti-rotation component 64 may be a variety of shapes including, but not limited to, semi-circular, oval, triangular, rectangular, or any other polygonal shape as long as the fourth anti-rotation component 64 extends radially inward toward the axis A from the bearing housing 24. Said differently, in the embodiments where the fourth anti-rotation component 64 extends radially inward toward the axis A from the bearing housing 24, the fourth anti-rotation component 64 protrudes away from the bearing housing 24. Similarly, the third anti-rotation component 62 may be defined recessed into the bushing 30 to have a complementary shape as to the shape of the fourth anti-rotation component 64 to be engagable with the fourth anti-rotation component 64.

Although not required, the bushing 30 at one of the first and second bushing ends 32, 34 may have a lip 66 protruding axially away from the other of the first and second bushing ends 32, 34. When present, the lip 66 and the retention shoulder 38 may define a gap 68 radially therebetween. Alternatively, the lip 66 and the retention shoulder 38 may be flush with one another such that no gap is present radially therebetween. It is to be appreciated that the lip 66 and the retention shoulder 38 may be flush in some sections and may define the gap 68 in other sections. When present, the lip 66 may include the first anti-rotation component 36.

In the embodiments where the first anti-rotation component 36 extends radially away from the bushing 30 and the second anti-rotation component 42 of the retention shoulder 38 is defined recessed into the retention shoulder 38, the first anti-rotation component 36 may extend from the lip 66 through the gap 68 and toward the second anti-rotation component 42 to engage the second anti-rotation component 42. In the embodiments where the first anti-rotation component 36 of the bushing 30 is defined recessed into the bushing 30 and the second anti-rotation component 42 of the retention shoulder 38 extends axially toward the bushing 30, the first anti-rotation component 36 may be defined recessed into the lip 66, and the second anti-rotation component 42 of the retention shoulder 38 may extend through the gap 68 and toward the first anti-rotation component 36 to engage the first anti-rotation component 36.

Although not required, the bushing 30 may be a semi-floating bushing. Semi-floating bushings are optimally used in light vehicle applications, such as in passenger vehicles, because of their low cost and high performance for the low cost of the semi-floating bushing. It is to be appreciated, however, that the bushing 30 may also be a journal bearing or a rolling element bearing.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for delivering compressed air to an internal combustion engine, said turbocharger comprising:
    a shaft extending along an axis between a first shaft end and a second shaft end;
    a turbine wheel coupled to said first shaft end of said shaft;
    a compressor wheel coupled to said second shaft end of said shaft; and
    a bearing housing assembly comprising;
        a bearing housing disposed about said shaft and presenting an interior surface having a first diameter, with said interior surface defining a bearing housing interior;
        a bushing disposed in said bearing housing interior, extending between a first bushing end and a second bushing end, and coupled to said shaft for supporting rotation of said shaft, with said bushing including a first anti-rotation component; and
        a retention shoulder extending away from said interior surface of said bearing housing and radially inward toward said axis proximate to one of said first and second bushing ends, with said retention shoulder presenting an inner surface having a second diameter less than said first diameter to limit axial movement of said bushing within said bearing housing interior, and with said retention shoulder including a second anti-rotation component engagable with said first anti-rotation component to limit rotational movement between said bushing and said bearing housing,
    wherein said first anti-rotation component extends radially away from said bushing and said second anti-rotation component of said retention shoulder is defined recessed into said retention shoulder.

2. The turbocharger as set forth in claim 1, wherein said retention shoulder is spaced from said first and second bushing ends along said axis such that one of said first and second bushing ends is disposed between said retention shoulder and the other of said first and second bushing ends.

3. The turbocharger as set forth in claim 1, wherein one of said first and second bushing ends of said bushing has a first retaining surface extending radially away from said axis and facing away from the other of said first and second bushing ends, and said retention shoulder has a second retaining surface facing said first retaining surface to limit axial movement of said bushing within said bearing housing interior.

4. The turbocharger as set forth in claim 1, wherein said bushing has an outer surface facing said interior surface of said bearing housing, and wherein said outer surface of said bushing axially adjacent to said retention shoulder has a third diameter between said first and second diameters to limit axial movement of said bushing within said bearing housing interior.

5. The turbocharger as set forth in claim 4, wherein said outer surface of said bushing axially adjacent to said retention shoulder has a generally circular cross-section.

6. The turbocharger as set forth in claim 1, wherein said retention shoulder has a generally circular cross-section.

7. The turbocharger as set forth in claim 1, wherein said bushing is integral between said first and second bushing ends.

8. The turbocharger as set forth in claim 1, wherein said first bushing end is proximate to said first shaft end, and wherein said retention shoulder extends away from said interior surface of said bearing housing and radially inward toward said axis proximate to said first bushing end.

9. The turbocharger as set forth in claim 1, wherein said second bushing end is proximate to said second shaft end, and wherein said retention shoulder extends away from said interior surface of said bearing housing and radially inward toward said axis proximate to said second bushing end.

10. The turbocharger as set forth in claim 1, wherein said retention shoulder is integral with said bearing housing.

11. The turbocharger as set forth in claim 1, wherein said retention shoulder is further defined as a retaining ring separate from said bearing housing.

12. The turbocharger as set forth in claim 11, wherein said bushing includes a third anti-rotation component and said bearing housing includes a fourth anti-rotation component engagable with said third anti-rotation component to limit rotational movement between said bushing and said bearing housing.

13. The turbocharger as set forth in claim 1, wherein said bushing at one of said first and second bushing ends has a lip protruding axially away from the other of said first and second bushing ends.

14. The turbocharger as set forth in claim 13, wherein said lip and said retention shoulder define a gap radially therebetween.

15. The turbocharger as set forth in claim 13, wherein said lip includes said first anti-rotation component.

16. A bearing housing assembly for a turbocharger having a shaft extending along an axis between first and second shaft ends, said bearing housing assembly comprising:
   a bearing housing configured to be disposed about the shaft and presenting an interior surface having a first diameter, with said interior surface defining a bearing housing interior;
   a bushing disposed in said bearing housing interior, extending between a first bushing end and a second bushing end, and configured to be coupled to the shaft for supporting rotation of the shaft, with said bushing including a first anti-rotation component; and
   a retention shoulder extending away from said interior surface of said bearing housing and radially inward toward the axis proximate to one of said first and second bushing ends, with said retention shoulder presenting an inner surface having a second diameter less than said first diameter to limit axial movement of said bushing within said bearing housing interior, and with said retention shoulder including a second anti-rotation component engagable with said first anti-rotation component to limit rotational movement between said bushing and said bearing housing,
   wherein said bushing at one of said first and second bushing ends has a lip protruding axially away from the other of said first and second bushing ends, and
   wherein said lip and said retention shoulder define a gap radially therebetween.

17. The bearing housing assembly as set forth in claim 16, wherein said retention shoulder is integral with said bearing housing.

18. The bearing housing assembly as set forth in claim 16, wherein said retention shoulder is further defined as a retaining ring separate from said bearing housing.

19. The bearing housing assembly as set forth in claim 16, wherein said lip includes said first anti-rotation component.

20. A turbocharger for delivering compressed air to an internal combustion engine, said turbocharger comprising:
   a shaft extending along an axis between a first shaft end and a second shaft end;
   a turbine wheel coupled to said first shaft end of said shaft;
   a compressor wheel coupled to said second shaft end of said shaft; and
   a bearing housing assembly comprising;
      a bearing housing disposed about said shaft and presenting an interior surface having a first diameter, with said interior surface defining a bearing housing interior;
      a bushing disposed in said bearing housing interior, extending between a first bushing end and a second bushing end, and coupled to said shaft for supporting rotation of said shaft, with said bushing including a first anti-rotation component; and
      a retention shoulder extending away from said interior surface of said bearing housing and radially inward toward said axis proximate to one of said first and second bushing ends, with said retention shoulder presenting an inner surface having a second diameter less than said first diameter to limit axial movement of said bushing within said bearing housing interior, and with said retention shoulder including a second anti-rotation component engagable with said first anti-rotation component to limit rotational movement between said bushing and said bearing housing,
      wherein said first anti-rotation component of said bushing is defined recessed into said bushing and said second anti-rotation component of said retention shoulder extends radially inward toward said axis from said retention shoulder.

* * * * *